United States Patent [19]
Bloom

[11] Patent Number: 6,000,858
[45] Date of Patent: Dec. 14, 1999

[54] APPARATUS FOR, AND METHOD OF, FORMING A LOW STRESS TIGHT FIT OF AN OPTICAL FIBER TO AN EXTERNAL ELEMENT

[76] Inventor: Cary Bloom, 5272 River Rd., Bethesda, Md. 20816

[21] Appl. No.: 08/880,073

[22] Filed: Jun. 20, 1997

Related U.S. Application Data

[63] Continuation-in-part of application No. 08/679,059, Jul. 12, 1996, Pat. No. 5,680,495, and a continuation-in-part of application No. 08/763,125, Dec. 10, 1996, Pat. No. 5,815,619, and a continuation-in-part of application No. 08/763,052, Dec. 10, 1996, Pat. No. 5,805,757, and a continuation-in-part of application No. 08/763,122, Dec. 10, 1996, Pat. No. 5,871,559, and a continuation-in-part of application No. 08/866,385, May 30, 1997, Pat. No. 5,971,629

[60] Provisional application No. 60/040,875, Mar. 21, 1997.

[51] Int. Cl.[6] .............................. G02B 6/00; G02B 6/36
[52] U.S. Cl. ................................................................ 385/94
[58] Field of Search ........................................ 385/80–95

[56] References Cited

U.S. PATENT DOCUMENTS

| | | |
|---|---|---|
| Re. 33,296 | 8/1990 | Stowe et al. . |
| Re. 34,955 | 5/1995 | Anton et al. . |
| 3,854,003 | 12/1974 | Duret . |
| 4,026,632 | 5/1977 | Hill et al. . |
| 4,611,894 | 9/1986 | Roberts . |
| 4,699,453 | 10/1987 | Roberts . |
| 4,701,010 | 10/1987 | Roberts . |
| 4,707,065 | 11/1987 | Jenkins . |
| 4,714,316 | 12/1987 | Moore et al. . |
| 4,763,977 | 8/1988 | Kawasaki et al. . |
| 4,772,085 | 9/1988 | Moore et al. . |
| 4,779,945 | 10/1988 | Hill et al. . |
| 4,792,203 | 12/1988 | Nelson et al. . |
| 4,798,438 | 1/1989 | Moore et al. . |
| 4,834,481 | 5/1989 | Lawson et al. . |
| 4,895,423 | 1/1990 | Bilodeau et al. . |
| 4,900,119 | 2/1990 | Hill et al. . |
| 4,906,068 | 3/1990 | Olson et al. . |

(List continued on next page.)

FOREIGN PATENT DOCUMENTS

| | | |
|---|---|---|
| 58216216 | 12/1983 | European Pat. Off. . |
| 0 104 513 | 4/1984 | European Pat. Off. . |
| 0293289 | 5/1988 | European Pat. Off. . |
| 0 285 784 | 10/1988 | European Pat. Off. . |
| 0285784A1 | 10/1988 | European Pat. Off. ................. 385/94 |
| 0 628 840 | 12/1994 | European Pat. Off. . |
| 0628840A1 | 12/1994 | European Pat. Off. ................. 385/94 |
| 2235043A | 8/1990 | United Kingdom . |
| WO87/00934 | 7/1986 | WIPO . |
| 0215668A2 | 9/1986 | WIPO . |
| WO 86/05596 | 9/1986 | WIPO . |
| WO 93/13442 | 7/1993 | WIPO . |
| WO 96/37794 | 11/1996 | WIPO . |

OTHER PUBLICATIONS

"Automated Fabrication of Fused Fibre Optic Couplers", Swain, R., M. Phil. dissertation, Heriot–Watt University, Edinburgh, Ireland (1993).

"Tapered Optical Fiber Components and Sensors", by L.C. Bobb, et al., Microwave journal, May 1992.

"The Shape of Fiber Tapers", by T.A. Birks et al., Journal of Lightwave Technology, IEEE, vol. 10, No. 4, Apr. 1992, pp. 432–438.

(List continued on next page.)

*Primary Examiner*—Akm E. Ullah
*Attorney, Agent, or Firm*—Irah H. Donner; Pepper Hamilton LLP

[57] ABSTRACT

An apparatus includes at least one optical fiber device including a region, and a ferrule having an aperture therethrough filled with a metal alloy securing material therein. The metal alloy securing material is softened responsive to application of energy thereto, and the region of the optical fiber device is inserted therethrough for securing to the aperture of the ferrule.

26 Claims, 4 Drawing Sheets

U.S. PATENT DOCUMENTS

| | | |
|---|---|---|
| 4,923,273 | 5/1990 | Taylor . |
| 4,957,338 | 9/1990 | Thorncraft et al. . |
| 4,995,688 | 2/1991 | Anton et al. . |
| 4,997,243 | 3/1991 | Aiki et al. . |
| 4,997,245 | 3/1991 | DuPuy et al. . |
| 4,997,247 | 3/1991 | Stowe . |
| 4,997,248 | 3/1991 | Stowe . |
| 4,997,252 | 3/1991 | Sugawara et al. . |
| 4,997,253 | 3/1991 | Enochs . |
| 5,013,117 | 5/1991 | Fukuma . |
| 5,013,121 | 5/1991 | Anton et al. . |
| 5,028,110 | 7/1991 | Plummer . |
| 5,031,994 | 7/1991 | Emmons . |
| 5,037,176 | 8/1991 | Roberts et al. . |
| 5,066,149 | 11/1991 | Wheeler et al. . |
| 5,067,678 | 11/1991 | Henneberger et al. . |
| 5,093,885 | 3/1992 | Anton . |
| 5,121,453 | 6/1992 | Orazi et al. . |
| 5,123,219 | 6/1992 | Beard et al. . |
| 5,136,121 | 8/1992 | Kluska et al. . |
| 5,157,751 | 10/1992 | Maas et al. . |
| 5,159,655 | 10/1992 | Ziebol . |
| 5,166,992 | 11/1992 | Cassidy et al. . |
| 5,166,994 | 11/1992 | Stowe et al. . |
| 5,179,608 | 1/1993 | Ziebol et al. . |
| 5,179,618 | 1/1993 | Anton . |
| 5,189,723 | 2/1993 | Johnson et al. . |
| 5,208,894 | 5/1993 | Johnson et al. . |
| 5,214,732 | 5/1993 | Beard et al. . |
| 5,214,735 | 5/1993 | Henneberger et al. . |
| 5,216,736 | 6/1993 | Essert ................................ 385/96 |
| 5,222,176 | 6/1993 | Webber et al. . |
| 5,239,604 | 8/1993 | Ziebol et al. . |
| 5,251,002 | 10/1993 | Gryk . |
| 5,261,019 | 11/1993 | Beard et al. . |
| 5,274,731 | 12/1993 | White . |
| 5,283,852 | 2/1994 | Gibler et al. . |
| 5,293,440 | 3/1994 | Miles et al. . |
| 5,293,582 | 3/1994 | Beard et al. . |
| 5,305,405 | 4/1994 | Emmons et al. . |
| 5,316,243 | 5/1994 | Henneberger . |
| 5,317,663 | 5/1994 | Beard et al. . |
| 5,319,728 | 6/1994 | Lu et al. . |
| 5,319,733 | 6/1994 | Emmons et al. . |
| 5,329,600 | 7/1994 | Sasaoka et al. . |
| 5,343,544 | 8/1994 | Boyd et al. . |
| 5,355,426 | 10/1994 | Daniel et al. . |
| 5,363,465 | 11/1994 | Korkowski et al. . |
| 5,367,591 | 11/1994 | Seike et al. . |
| 5,381,497 | 1/1995 | Toland et al. . |
| 5,386,484 | 1/1995 | Ooka et al. . |
| 5,386,488 | 1/1995 | Oikawa . |
| 5,386,490 | 1/1995 | Pan et al. . |
| 5,395,101 | 3/1995 | Takimoto et al. . |
| 5,422,969 | 6/1995 | Eno . |
| 5,432,875 | 7/1995 | Korkowski et al. . |
| 5,445,319 | 8/1995 | Pan et al. . |
| 5,459,598 | 10/1995 | Carrington . |
| 5,463,704 | 10/1995 | Ziebol . |
| 5,475,780 | 12/1995 | Mizrahi . |
| 5,475,782 | 12/1995 | Ziebol . |
| 5,475,784 | 12/1995 | Bookbinder et al. . |
| 5,497,444 | 3/1996 | Wheeler . |
| 5,577,149 | 11/1996 | Averbeck et al. . |
| 5,588,087 | 12/1996 | Emmons et al. . |
| 5,602,952 | 2/1997 | Rashleigh et al. . |

OTHER PUBLICATIONS

"Mass Production of Fused Couplers and Coupler Based Devices", by W.E. Moore et al.

"Loss and Spectral Control in Fused Tapered Couplers", by K.P. Oakley et al., Optical Engineering, vol. 33, No. 12, Dec. 1994, pp. 4006–4019.

"Control of Optical Fibre Taper Shape", Electronics Letters, vol. 27, No. 18, Aug. 29, 1991.

"Fiber–Coupler Fabrication with Automatic Fusion–Elongation Processes for Low Excess Loss and High Coupling-Ratio Accuracy", by I. Yokohama, et al., Journal of Lightwave Technology, IEEE, vol. LT–5, No. 7, Jul. 1987. IC Assembly Technology, pp. 3–26–3–32.

Fibre–optic Coupler Fabrication at AOFR, by A.J. Stevenson et al., International Journal of Optoelectronics, vol. 6, Nos. 1/2, 1991, pp. 127–144.

"From your space . . . to outer space", Fibre Bragg Gratings, 3M Innovation, Circle No. 76. (No Date).

"100ips & 2 microns", Anorad linear motor gantries, Anorad Corporation, Circle 7. (No Date).

"1 $\mu$m, 2g, 3m/s", Anorad LW linear motor stages, Anorad Corporation, Circle 7. (No Date).

"The New Standard for Case Erecting and Sealing", ABC Packaging Machine Corporation, Circle 22. (No Date).

"All Product Brochure" Schleuniger, Inc., pp. 1–12. (No Date).

"Schleuniger US 2545 Stripping Machine", Schleuniger, Inc. (No Date).

"Schleuniger FO 7010 Kelvar Cutting Machine", Schleuniger, Inc. (No Date).

"Schleuniger PF 1000/PF 2000 Electric Demand Prefeeders", Schleuniger, Inc. (No Date).

"CP 1200 Coiling Unit", Schleuniger, Inc. (No Date).

"Schleuniger WS 1500/CP 1250 Wire Stacker/Coiling Pan", Schleuniger, Inc. (No Date).

"Premise Wiring Communication Fiber Optics", Fiber Instrument Sales Inc., 15th Edition, 1997, pp. 1–68.

APPARATUS FOR, AND METHOD OF, FORMING A LOW STRESS TIGHT FIT OF AN OPTICAL FIBER TO AN EXTERNAL ELEMENT

RELATED APPLICATIONS

This application claims priority from U.S. provisional application 60/040,875, filed on Mar. 21, 1997, entitled "Methods, Devices and Articles of Manufacture for Optical Fibers and Optical Fiber Systems", incorporated herein by reference. This application is a continuation-in-part application of U.S. application Ser. No. 08/679,059, filed on Jul. 12, 1996 now U.S. Pat. No. 5,680,495, a continuation-in-part application of U.S. application Ser. No. 08/763,125 now U.S. Pat. No. 5,815,619, filed on Dec. 10, 1996, a continuation-in-part application of U.S. application Ser. No. 08/763,052, filed on Dec. 10, 1996 now U.S. Pat. No. 5,805,757, U.S. application Ser. No. 08/763,122 filed on Dec. 10, 1996 now U.S. Pat. No. 5,871,559, and a continuation-in-part application of U.S. application Ser. No. 08/866,385, entitled "APPARATUS AND METHOD BONDING OPTICAL FIBER AND/OR DEVICE TO EXTERNAL ELEMENT USING COMPLIANT MATERIAL INTERFACE" to the same applicant, filed on May 30, 1997, now U.S. Pat. No. 5,971,629, all of which are incorporated herein by reference.

BACKGROUND OF THE INVENTION

1. Field of the Invention

The present invention relates to an apparatus for, and method of, forming a low stress tight fit of an optical fiber to an external element, and more particularly, to an apparatus for, and method of, accurately and reliably forming a low stress tight fit of an optical fiber to a ferrule.

2. Background of the Related Art

Currently, various techniques exist for stabilizing an optical fiber and/or device to an external substrate or connector system, such as a ferrule. For example, one technique involves using an epoxy to affix the optical fiber to an external substrate. Another technique disclosed in U.S. Pat. No. 5,475,784 to Bookbinder, et al. encapsulates a segment of organic material of an optical component, such as a junction, by directly placing molten metal around the component and solidifying the metal.

U.S. Pat. Nos. 5,293,582 and 5,261,019 to Beard et al. relate to a fiber optic connector including a ferrule assembly having a fiber within a ferrule. The ferrule is received within a hub held in a barrel. An inner spring urges the ferrule and hub outwardly from the barrel. A nut is movably attached to the barrel. An outer spring biases the barrel toward a connector end of a housing. The fiber is secured within a bore of the ferrule through any "commercially known means" (column 3, lines 12–14).

U.S. Pat. No. 5,381,497 to Toland et al. relate to a fiber optic connector including a ferrule received within a ferrule holder. The ferrule holder is provided with venting to evacuate air from an adhesive receiving chamber to avoid air pocket formation in adhesive.

U.S. Patent to Ziebol et al. relates to a connector including a crimp, a ferrule holder and ferrule. The crimp is generally cylindrical in shape and has a reduced diameter portion on one end. The crimp is received within a cylindrical cavity formed in the ferrule holder. The ferrule holder has a centrally disposed bore into which the ferrule is press fit. The fiber is physically retained by the crimp and free floating within ferrule. As a result, a length of the fiber is unsupported. The crimp is the only element of the connector having a grasping contact on the fiber.

In Ziebol et al., the fiber is retained within the crimp by positioning the fiber sheathed portion within an enlarged bore, and extending the remainder of the unsheathed fiber through a V-groove and another bore. The crimp is then forced within the body of the ferrule holder. The crimping action results in the fiber being securely and rigidly held between the three opposing surfaces of the V-groove.

However, the resulting secured optical fiber according to these prior techniques often times is not properly secured to the external substrate, and/or element, and/or ferrule. These processes are difficult to automate, and do not provide good yield results. For example, the use of epoxy makes the manufacturing process difficult. Similarly, the use of a crimping action can damage the ferrule and/or optical fiber.

It is therefore desirable to provide accurate and consistent production of optical fibers that are secured to an external substrate, element and/or ferrule, for strength, support, and protection.

It is also desirable to provide production techniques to secure optical fibers to an external substrate, element and/or ferrule.

It is also desirable to provide a procedure that allows a connector to be attached or secured to an optical fiber, ferrule, substrate and/or element, quickly, reliably, and inexpensively.

It is also desirable to provide a procedure to automate the attachment of connectors to optical fibers by field personnel.

It is also desirable to provide a procedure to automatically produce fiber optic patch cords and pigtails.

SUMMARY OF THE INVENTION

It is a feature and advantage of the present invention to provide accurate and consistent production of optical fibers that are secured to an external substrate, element and/or ferrule, for strength, support, and protection.

It is a feature and advantage of the present invention to provide production techniques to secure optical fibers to an external substrate, element and/or ferrule.

It is a feature and advantage of the present invention to provide a procedure that allows a connector to be attached or secured to an optical fiber, ferrule, substrate and/or element, quickly, reliably, and inexpensively.

It is a feature and advantage of the present invention to provide a procedure to automate the attachment of connectors to optical fibers by field personnel.

It is a feature and advantage of the present invention to provide a procedure to automatically produce fiber optic patch cords and pigtails.

The present invention accurately and reliably secures an optical fiber (or other device, optical fiber device having similar requirements) with an external substrate and/or element, such as a ferrule. The present invention may be used, for example, to attach connectors to the ends of optical fibers.

The present invention is based, in part, on the discovery or identification of the problem that during the standard process for securing, for example, an optical fiber to substrate, element and/or ferrule, the optical fiber is not being stabilized, bonded, sealed, and the like, in a quick, reliable, inexpensive and highly automated manner. Accordingly, the manufacturing/production industry of optical fibers and/or devices has been unable to meet the demands to satisfy industry needs of same. As a result, optical fibers, and/or connectors utilizing same, are unnecessarily expensive due to the standard economic supply/demand theory.

Advantageously, I have discovered that a simple procedure may be used to stabilize, bond, and/or seal an optical fiber to an external element in a quick, reliable, inexpensive and highly automated manner. Accordingly, optical fiber, connector, and/or device production will be greatly increased due to this new category or class of techniques described herein.

In addition, I have discovered that the above techniques may be used for accurate and consistent production of high quality optical fibers, connectors, and/or devices that are bonded to an external substrate for strength, support, and protection.

In accordance with one embodiment of the invention, an apparatus includes at least one optical fiber device including a region, and a ferrule having an aperture therethrough filled, completely or partially, with a metal alloy securing material therein. The metal alloy securing material is softened responsive to application of energy thereto, and the region of the optical fiber device is inserted therethrough for securing to the aperture of the ferrule.

In accordance with another embodiment of the invention, a method includes the steps of disposing a metal alloy securing material having a first coefficient of expansion in an aperture of a ferrule having a second coefficient of expansion less than the first coefficient of expansion. The method also includes softening the metal alloy securing material, if the material is not already sufficiently soft, responsive to application of energy to the metal alloy securing material and/or the ferrule. The method also includes inserting a region of at least one optical fiber device having a third coefficient of expansion substantially similar to the second coefficient of expansion through the metal alloy securing material for securing to the aperture of the ferrule.

Additional apparatus and methods are also provided where no interface layer may be necessary, or where the optical fiber device is secured to a substrate.

These together with other objects and advantages which will be subsequently apparent, reside in the details of construction and operation as more fully herein described and claimed, with reference being had to the accompanying drawings forming a part hereof wherein like numerals refer to like elements throughout.

DESCRIPTION OF PREFERRED EMBODIMENT OF THE INVENTION

The present invention is used on, and provides accurate and reliable production and/or packaging of, optical fibers, devices and/or fiber optic devices (hereinafter "optical fiber") such as couplers, switches, wave-division multiplexers (WDM), filters, attenuators, polarizers, waveguides, fiber optic sensors and the like, that provide substantially similar optical responses, properties and/or indicators. These various fiber optic devices, such as the WDM, may be constructed of different materials such as glass, crystal, metal, plastic, ceramic and the like.

The present invention is used on, and provides accurate and reliable production and/or packaging of, optical fibers, devices and/or fiber optic devices for reinforcing, sealing and connection of same to an external substrate, element, and/or ferrule (hereinafter "external substrate"), described above. One principal advantage of this procedure is that it allows the optical fiber, device and/or fiber optic device to be sealed and/or secured to an external substrate possibly without exposing same to damaging temperature extremes. A principal use of this procedure could be to connect or secure an optical fiber to an external substrate, element and/or ferrule, that may be highly temperature sensitive. This technique will quickly and inexpensively package and/or hermetically package temperature sensitive devices in a highly automated manner.

Another principal advantage of this procedure is that it allows an optical fiber to be sealed or connected quickly, simply, reliably, and inexpensively. A principal use of this procedure could be to provide connectors and/or package devices for a manufacturer. This technique will also quickly and inexpensively seal, connect and/or package devices in a highly automated manner.

To illustrate the above techniques, I will conceptually demonstrate the attachment of a connector to the end of an optical fiber. The packaging of other or multiple optical fibers, devices, and/or fiber optic devices would be similar. The optical fiber in the example described below has only a single optical fiber, however, the process described herein may also be used for multiple optical fibers exiting opposite sides of a device. Further, the techniques described herein could also be applied to any device with at least a single optical fiber exiting therefrom.

The production and/or packaging of other optical fibers, devices and/or fiber optic devices would be similar (with the exception that some steps may be added and/or omitted based on the specific device being formed), including production of single optical fibers and/or devices.

Figure 1:
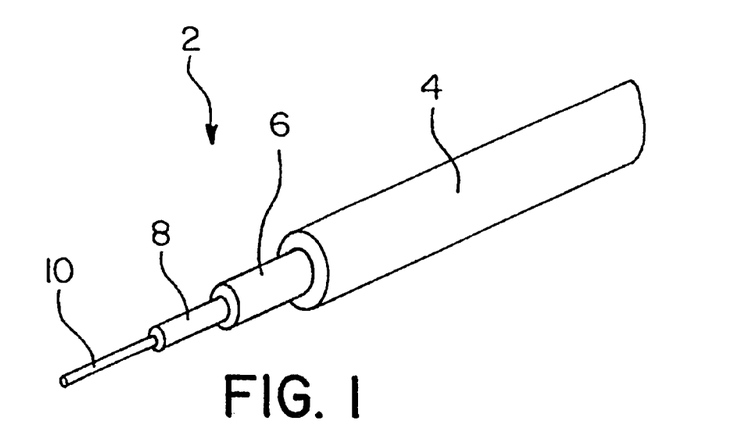
FIG. 1 shows a cabled optical fiber, properly stripped and ready for the attachment of a connector.

FIG. 1 shows a cabled optical fiber, properly stripped and ready for the attachment of a connector. The cabled optical fiber 2 is comprised of an outer nylon protective jacket 4, a Kevlar yarn strength member 6, a polymer tight buffer coating 8, and the optical fiber 10. Of course, other optical fiber structures can be used with the process of the present invention described herein. That is, the structure of the various coating used in connection with the optical fiber, device, and/or fiber optic device, does not affect the processes and resulting products described herein.

Figure 2:
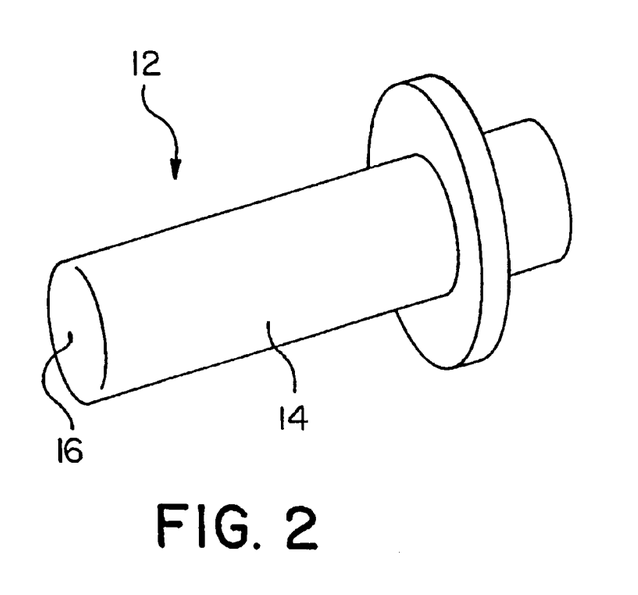
FIG. 2 shows a ferrule within which the optical fiber will be secured.

FIG. 2 shows a ferrule within which the optical fiber will be secured. The ferrule 12, which may be made of ceramic, stainless steel, or other suitable material, is precision bored, for example, exactly in its center, with a hole 16 that is advantageously nominally larger than the diameter of, for example, the optical fiber. The bore hole 16 shown in the center of the tip 14 on the left end of the ferrule 12 is, for example, filled with pure aluminum. Other materials having similar properties/characteristics as pure aluminum can also be used in connection with the process described herein.

The specific configuration of the ferrule and bore hole are merely exemplary, and not to be used to limited the process and resulting product of the present invention. For example, instead of the ferrule configuration described in FIG. 2, a thin disc-like shape, box, or other shape may be utilized. Further, in some instances, the aluminum or similar material might be pre-disposed on an edge surface at the junction of one or materials to facilitate connection to an external element. Other compositions and/or structures and/or shapes of ferrule 12 may also be used.

Figure 3:
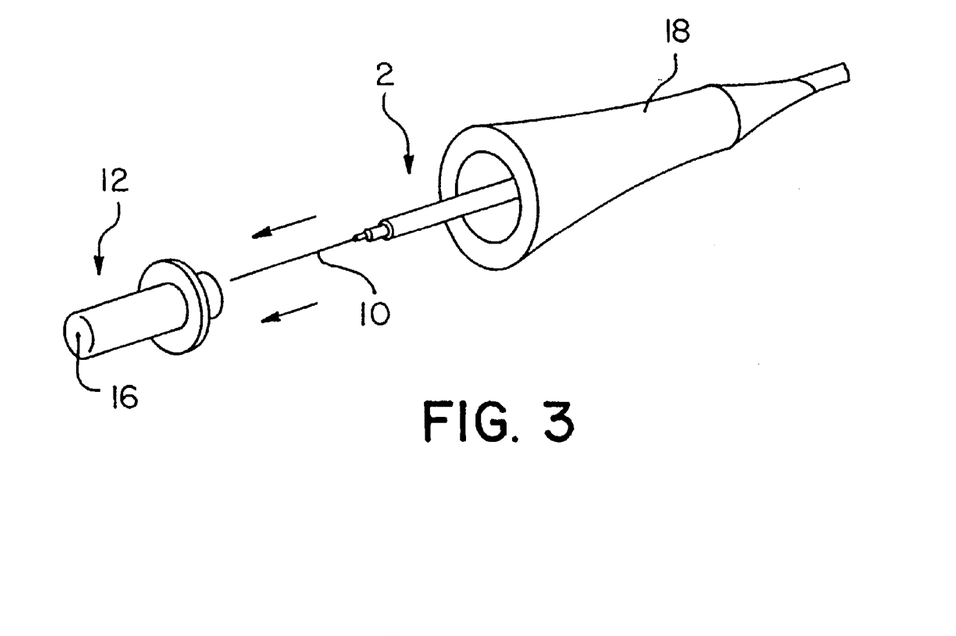
FIG. 3 shows that the ferrule is heated to a sufficient temperature to melt the aluminum and to cause the bore hole to expand enough to allow the optical fiber to be easily inserted.

FIG. 3 shows that the ferrule 12 is heated to a sufficient temperature to melt the aluminum and to cause the bore hole 16 to expand enough to allow the optical fiber 10 stripped from protected sheathing 2 to be easily inserted. The optical fiber 10, which has been properly prepared with the necessary connector components, such as boot 18, is inserted through, into and/or onto, the expanded bore hole 16 of the heated ferrule 12, displacing most of the molten aluminum within the bore hole. As described above, other configurations of the external element may dictate whether the optical fiber is inserted within, into and/or onto the pure aluminum or other suitable material. Further, other compositions and/or structures and/or shapes of boot 18 and/or sheathing 2 may also be used.

Figure 4:
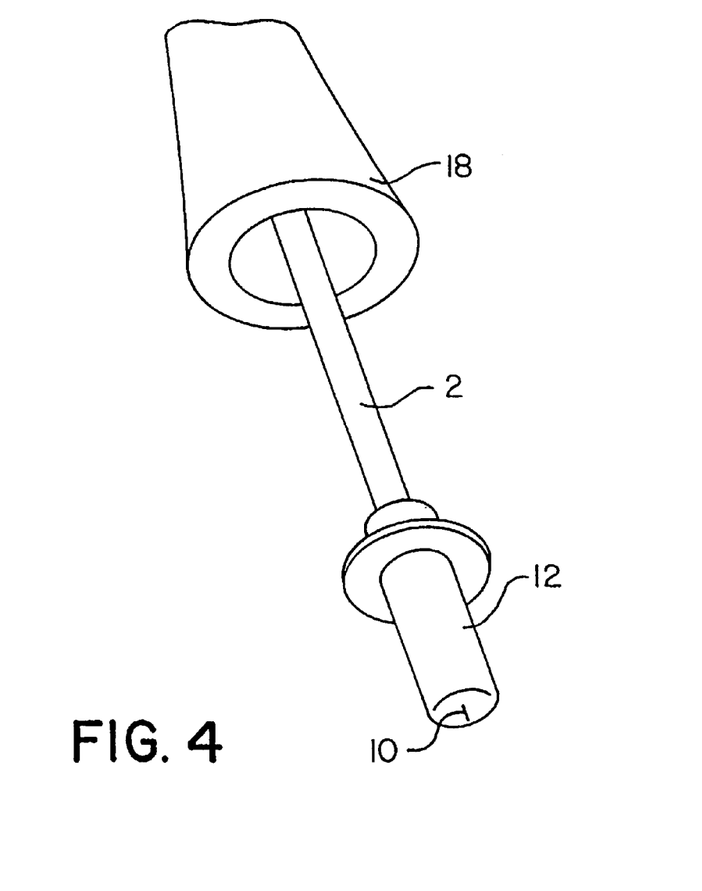
FIG. 4 shows that the optical fiber is now in place within the ferrule.

FIG. 4 shows that the optical fiber 10 is now in place within the ferrule 12. As the thin layer of remaining aluminum cools, it safely chemically bonds to and compresses around the optical fiber 10, forming a tight seal and securely attaching the optical fiber 10 to the ferrule 12. As the ferrule 12 cools, the bore hole contracts, compressing and displacing the aluminum, ensuring that the optical fiber 10 is securely attached without stress, and that a tight seal is maintained. As discussed above, other materials than the aluminum may be used that do not chemically bond per se. That is, other materials may also be used to bond or secure to or compress around the optical fibers to secure the optical fiber to an external substrate, such as the bore in ferrule 12.

Other methods of heating the aluminum may also be used. For example, the aluminum may be heated by the localized application of energy, such as by a laser or ultrasonic transducer. The localized application of energy to heat the aluminum advantageously prevents damage to, for example, a device which is highly temperature sensitive and heating of the total device to promote sealing is impossible. Alternatively, the entire structure including, for example, the ferrule, may be heated to promote the necessary heating of the aluminum.

Figure 5:
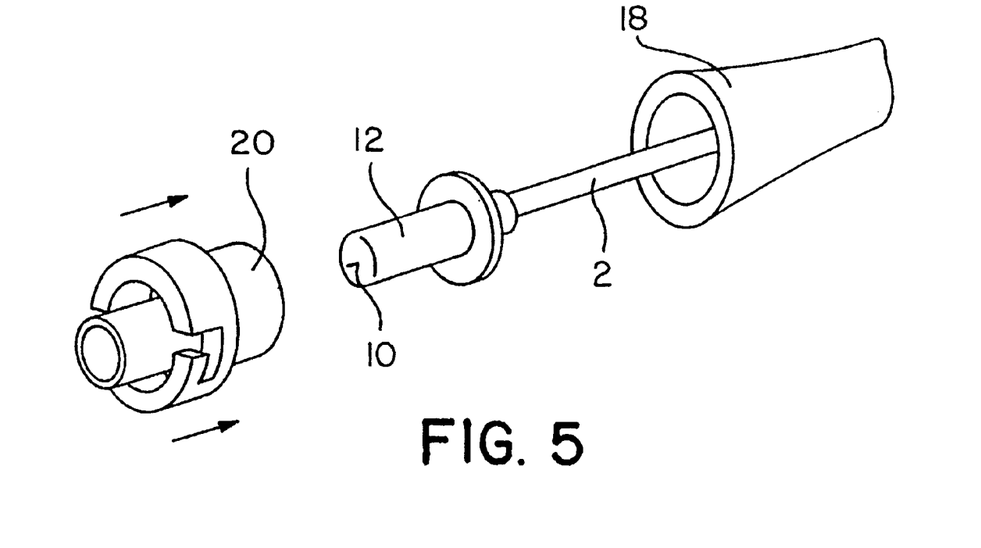
FIG. 5 shows that optical fiber is now securely attached within the ferrule.

FIG. 5 shows that the optical fiber 10 is now securely attached within the ferrule 12. Boot 18 and fiber sheathing 2 are illustrated prior to connection of boot 18 to ferrule 12. The connector body 20, to the left of the ferrule 12 is slid over the ferrule assembly 12. Other types of connectors can also be used, such as those illustrated in the U.S. patents incorporated by reference previously. Further, additional methods of connecting and/or securing the connector body 20 to ferrule 12 may also be used, such as welding, gluing, and the like.

Figure 6:
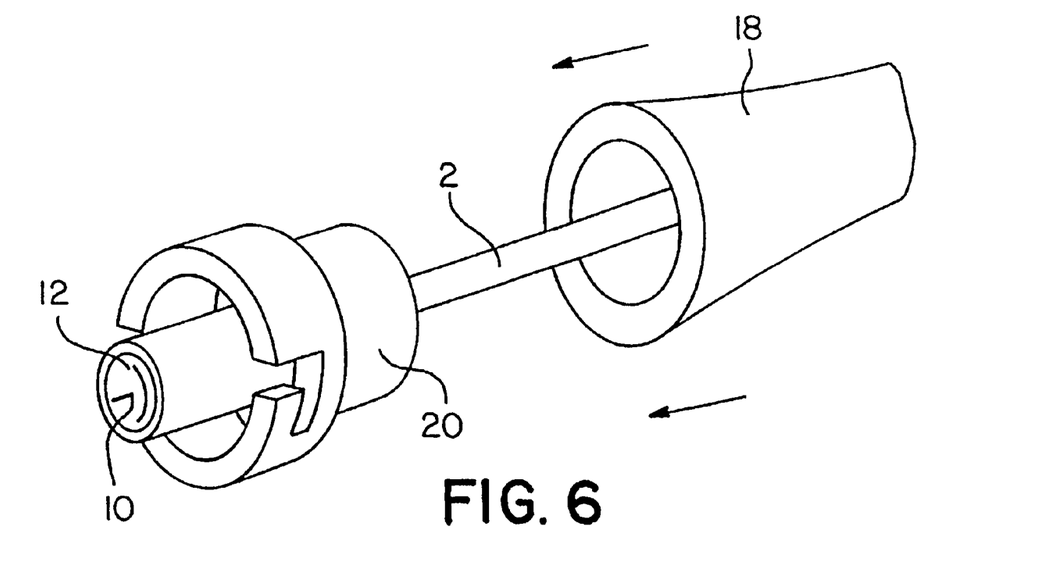
FIG. 6 shows that the connector body is now in place over the ferrule assembly.
Figure 7:
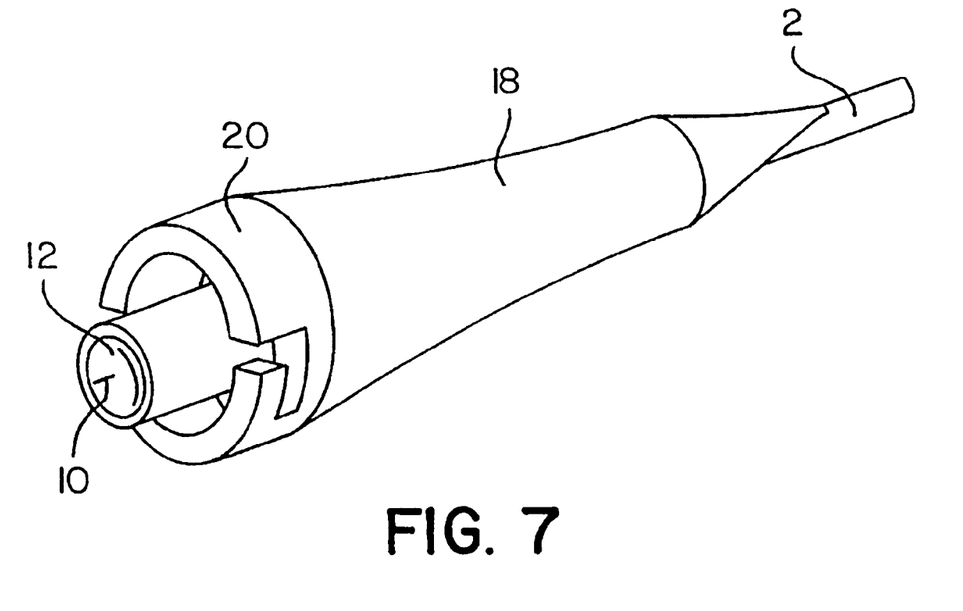
FIG. 7 shows that the connector is now securely attached to the end of the cabled optical fiber and is ready to be polished and used.

FIG. 6 shows that the connector body 20 is now in place over the ferrule assembly 12. The connector body 20 is attached to the ferrule assembly 12, and the boot 18 is slid over and attached to the connector body 20. FIG. 7 shows that the connector 20 is now securely attached to boot 18, ferrule 12, and sheathed section 2, with the optical fiber 10 exposed therefrom. The end of the cabled optical fiber 10 and is now ready to be polished and used.

Boot 18 is comprised of any suitable material, for example, rubber, fused silica with a similar composition as that of an optical fiber, and the like, to provide stress relief on the connector. The connection between boot 18 and connector 20 may also be coated with a thin layer of pure aluminum. Other compositions and/or structures and/or shapes of boot 18 may also be used. Similarly, other additional layers may be placed, sprayed, and the like, on the connector 20 and/or boot 18.

Alternatively, the junctions between the connector 20 and boot 18 may be tightly welded and sealed by the localized application of energy (or other application of energy such as heating the entire structure), such as by a laser or ultrasonic transducer, to prevent damage to the optical fiber disposed therein.

The connector 20 and boot 18 may form a shell that may also advantageously hermetically seal the entire assembly when coated with, for example, aluminum. As the aluminum shell cools, it compresses the connector 20 and boot 18 together, ensuring that the assembly is tightly sealed. In addition, alternating layers of aluminum and silica (or alternating layers of materials with similar properties as aluminum and silica) also ensures that a hermetic seal is maintained across a wide temperature range.

While the above steps or processes have described a technique for securing and/or sealing and/or hermetically sealing an optical fiber to an external substrate, the above processes may be used on any optical fiber, device and/or fiber optical device providing or requiring securing and/or bonding of an end and/or portion thereof to an external substrate for support, strength and/or protection. Further, the above process may be modified to suit particular connector and/or packaging needs where, for example, only one or multiple layers of connector and/or packaging are required and/or different shapes and/or compositions of the connectors and/or packaging are required.

The above process illustrates one method of taking advantage of the simplified and inexpensive securing and/or bonding process of the present invention. Thus, various other connection and/or packaging techniques may also be used to capitalize on, or use, the above securing and/or bonding process. In addition, other metals or coatings may be used to secure and/or seal the optical fiber, device, and/or fiber optic device to an external substrate described herein. Additional materials may also be used to seal the ends of the optical fiber, device, and/or fiber optic device as well.

The above structure advantageously allows the optical fiber, device, and/or fiber optic device to undergo or experience various environmental changes in conditions, while still having a portion thereof, or its entirety, secured, sealed and/or hermetically sealed. That is, the interplay of alternating layers of material that have different coefficients of expansions facilitates the securing, sealing and/or hermetically sealing of a portion of the optical fiber, device and/or fiber optic device.

For example, the use of alternating materials accomplishes the following. First, a material of higher coefficient of expansion is disposed around the optical fiber, device and/or fiber optic device generally having a lower coefficient of expansion. Next, a material of lower coefficient of expansion, for example, the ferrule, is disposed on and/or around the material of higher coefficient of expansion. When the entire structure is heated and/or compressed, the material of higher coefficient of expansion expands, but the outer material does not expand generally at the same rate and/or amount. Thus, the exterior of the device applies what may be considered a compressive force onto the material having a higher coefficient of expansion, thereby securing, sealing and/or hermetically sealing the optical fiber, device and/or fiber optic device thereby. Additional layers of material with similar alternating coefficient of thermal expansion characteristics may also be used, and are considered within the scope of the techniques or methods described herein.

While the above steps or processes have described a technique for securing and/or sealing and/or hermetically sealing an optical fiber to an external substrate such as a ferrule, the above processes may be used on any optical fiber, device and/or fiber optical device providing or requiring bonding of a portion and/or an end thereof to an external substrate for support, strength and/or protection. Further, the above process may be modified to suit particular packaging needs where, for example, only one layer of packaging or multiple layers of packaging are required or where different shapes and/or structures and/or compositions of packaging are required.

The above process illustrates one method of taking advantage of the simplified and inexpensive securing and/or bonding process of the present invention. Thus, various other connection and/or packaging techniques may also be used to capitalize on, or use, the above bonding process. In addition, other metals, materials and/or coatings may be used to seal and/or secure the optical fiber, device, and/or fiber optic device in the packaging described herein. Other materials may also be used to seal the ends of the optical fiber, device, and/or fiber optic device as well.

The ferrule described herein may be modified in numerous ways to facilitate the securing process described herein. For example, the ferrule may be modified so that no cavity is required, and/or so that the ferrule is of relative short length. In this instance, the ferrule is used to secure to a portion of an optical fiber, fiber optic device and/or device. The aperture of ferrule is not required to penetrate completely through it as well. That is, a ferrule may be used with a small or no depression, so long as the securing material is disposed at an area for the optical fiber to be connected thereto.

While the above examples have described the securing material being composed of pure aluminum, other metals or complaint materials may be used that act as a strain relief on the fiber optic device. For example, gold, aluminum alloys, gold alloys, and the like, may also be used as the complaint and/or securing material. Other ductile and/or malleable and/or compliant materials may also be used. For example, any soft glass-like material such as sealing glass may also be used.

In addition, while the above examples illustrate the situation when the securing material is, for example, heated to be softened, other methods of softening the securing material may be used. For example, various standard substances may be applied to the securing material for softening. Of course, the securing material need only be softened or soft to the point that it is softer that the fiber optic device being inserted thereon or therethrough. Thus, if the securing material is in a naturally and sufficiently soft state, no action or step to soften the securing material will be necessary. As discussed above, the hole in the ferrule need not be completely filled with the securing material to effectively secure the fiber optic device to the ferrule.

Advantageously, the present invention does not even require the use of a separate securing material when securing the fiber optic device to, for example, the ferrule. For instance, a ferrule having an aperture may be heated or applied energy/substance (e.g., locally at the aperture, the entire ferrule) to thereby expand the ferrule and the aperture therein. The optical fiber, which is dimensioned to be larger than the aperture of the ferrule prior to heating, can than be inserted in the expanded ferrule aperture. Thereafter, the energy is removed from the ferrule which then returns to its original state, thereby the aperture contracting or shrinkfitting around the optical fiber.

An alternative method of expanding the ferrule is to utilize a ferrule material with a negative coefficient of thermal expansion, such as a glass ceramic like material. In this alternative, the ferrule is, for example, cooled and thereby expanded including the hole disposed therein. The optical fiber may then be inserted in the expanded hole. The ferrule may then be returned to room temperature, heated and/or the cooling force removed, to return it to its previous state, and thereby exerting a compressive force on the optical fiber. Of course, other type of ferrule materials, and/or other methods of expanding the ferrule hole and/or contracting the optical fiber are considered within the scope of the present apparatus and method of securing a fiber optic device to an external substrate. For example, a piezo-electric like material may be used for the ferrule.

Another alternative is to dimension, and/or expand, and/or contract, the ferrule hole and/or the optical fiber for the ferrule to receive the optical fiber therethrough. A continuous contracting force may then be exerted on, and/or subjected to, the ferrule to secure the optical fiber to the ferrule. The continues contracting force may be, for example, subjecting the ferrule to a cooling force and/or placing the ferrule in a cool intended operating environment, and the like. Similar reasoning applies when the ferrule is constructed of a material with a negative coefficient of expansion. That is, a continuous expanding force may be exerted on, and/or subjected to, the optical fiber to secure the optical fiber to the ferrule. This has the added advantage of providing a potentially or user selectable temporary connection between the optical fiber and the ferrule until the ferrule and/or the optical fiber are removed from the contracting and/or expanding force, respectively, and vice versa.

Advantageously, the present invention also does not require the ferrule to be expanded to connect the optical fiber thereto. For example, the optical fiber may be cooled or applied a contracting energy/substance (e.g., locally at the connection area, the entire optical fiber) to thereby contract the optical fiber. The optical fiber, which may be dimensioned to be substantially equal to, slightly larger, or larger, (and if a compliant interface layer is used between the optical fiber and the ferrule as discussed above, slightly smaller), than the aperture of the ferrule prior to being contracted/shrunken, can then be inserted in the ferrule aperture. Thereafter, the energy/substance is removed, withdrawn or neutralized from the optical fiber which then returns to its original expanded state, thereby the optical fiber being expand-fitted around the optical fiber. One exemplary substance that can be used to contract the optical fiber device is liquid nitrogen.

Of course, as described above, both the ferrule may be expanded and the optical fiber may be contracted, sequentially, simultaneously, continuously, and the like, to further enhance the benefits of the present apparatus and method of securing a fiber optic device to an external substrate.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An apparatus, comprising:
   at least one of an optical fiber, device and fiber optic device, and fiber optic device, including a region and having a first thermal coefficient of expansion;
   an external element having an aperture therethrough filled with a securing material therein, the securing material having a second thermal coefficient of expansion greater than the first thermal coefficient of expansion, and the external element having a third thermal coefficient of expansion substantially similar to the first thermal coefficient of expansion,
   wherein the securing material is softened responsive to application of energy thereto, and the region is inserted therethrough for securing to the aperture of said external element via the securing material.

2. An apparatus, comprising:
   at least one of an optical fiber, device and fiber optic device, including a region and having a first thermal coefficient of expansion;
   an external element having an area provided with a securing material thereon, the securing material having a second thermal coefficient of expansion greater than the first thermal coefficient of expansion, and the external element having a third thermal coefficient of expansion substantially similar to the first thermal coefficient of expansion,
   wherein the securing material is softened responsive to application of energy thereto, and the region is introduced thereon for securing to said external element via the securing material.

3. An apparatus, comprising:
   at least one optical fiber device including a region and having a first thermal coefficient of expansion;
   a ferrule having an aperture therethrough filled with a metal securing material therein, the metal securing material having a second thermal coefficient of expansion greater than the first thermal coefficient of expansion, and said ferrule having a third thermal coefficient of expansion substantially similar to the first thermal coefficient of expansion,
   wherein the metal securing material is softened responsive to application of energy thereto, and the region is inserted therethrough for securing to the aperture of said ferrule via the metal securing material.

4. An apparatus, comprising:
   at least one optical fiber device including a region;
   a ferrule having an aperture therethrough filled with a metal securing material therein, the metal securing material being softened responsive to application of energy thereto, and the region of said at least one optical fiber device is inserted therethrough for securing to the aperture of said ferrule via the metal securing material.

5. An apparatus, comprising:
   at least one optical fiber device including a region;
   a ferrule having an aperture therethrough filled with a metal alloy securing material therein, the metal alloy securing material being softened responsive to application of energy thereto, and the region of said at least one optical fiber device being inserted therethrough for securing to the aperture of said ferrule via the metal alloy securing material.

6. An apparatus, comprising:
   at least one optical fiber device including a region;
   an external substrate having an area provided with a metal alloy securing material therein, the metal alloy securing material being softened responsive to application of energy thereto, and the region of said at least one optical fiber device being introduced thereon for securing to the area of said external substrate via the metal alloy securing material.

7. An apparatus, comprising:
   at least one optical fiber device including a region;
   a ferrule having a crater having a securing material disposed therein, the securing material being softened relative to said at least one optical fiber device responsive to application of energy thereto, and the region of said at least one optical fiber device being introduced thereon for securing to said ferrule via the securing material.

8. An apparatus, comprising:
   at least one optical fiber device including a region;
   a ferrule having an aperture completely or partially therethrough with a compliant material therein, the compliant material being softened responsive to application of energy thereto, and the region of said at least one optical fiber device being inserted therethrough for securing to the aperture of said ferrule via the compliant material.

9. An apparatus, comprising:
   at least one optical fiber device including a region;
   a ferrule having an aperture therethrough, the aperture of said ferrule being expanded responsive to application of energy thereto, and the region of said at least one optical fiber device being inserted therethrough while the aperture of said ferrule is expanded for securing to the aperture of said ferrule after the aperture subsequently contracts.

10. An apparatus, comprising:
    at least one optical fiber device including a region;
    a ferrule having an aperture, the aperture of said ferrule being expanded responsive to application of energy or an external substance thereto, and the region of said at least one optical fiber device being inserted therethrough while the aperture of said ferrule is expanded for shrinkfit securing thereto,
    wherein said region is dimensioned to be larger than said aperture prior to said application of energy thereto.

11. An apparatus, comprising:
    a ferrule having an aperture therethrough;
    at least one optical fiber device including a region and being shrunken responsive to application of energy or an external element thereto, and the region of said at least one optical fiber device being inserted through the aperture while said at least one optical fiber device is shrunken for shrinkfit securing thereto,
    wherein said region is dimensioned to be larger than said aperture prior to said application of energy thereto.

12. An apparatus of claims 1, 2, 3, 4, 5, 6, 7, or 8 wherein the optical fiber device comprises at least one of a wavelength division multiplexer, a wideband fiber optic coupler, a coupler, a switch, a filter, an attenuator, a waveguide, a fiber optic sensor, a sensor, a fiber optic coupler, an optical fiber and a polarizer.

13. A method, comprising the steps of:
   (a) disposing a metal alloy securing material in an aperture of a ferrule;
   (b) softening the metal alloy securing material responsive to application of energy thereto; and
   (c) inserting a region of at least one optical fiber device through the metal alloy securing material for securing to the aperture of the ferrule.

14. A method, comprising the steps of:
   (a) disposing a metal alloy securing material having a first coefficient of expansion in an aperture of a ferrule having a second coefficient of expansion less than the first coefficient of expansion;
   (b) softening the metal alloy securing material responsive to application of energy to the metal alloy securing material and/or the ferrule; and
   (c) inserting a region of at least one optical fiber device having a third coefficient of expansion substantially similar to the second coefficient of expansion through the metal alloy securing material for securing to the aperture of the ferrule.

15. A method, comprising the steps of:
   (a) disposing a metal alloy securing material on an area of a substrate;
   (b) softening the metal alloy securing material responsive to application of energy thereto; and
   (c) introducing a region of at least one optical fiber device on the metal alloy securing material for securing to the area of the substrate.

16. An optical fiber, device or optical fiber device produced in accordance with the process of claims 13, 14 or 15.

17. A apparatus of claims 9, wherein the optical fiber device comprises at least one of a wavelength division multiplexer, a wideband fiber optic coupler, a coupler, a switch, a filter, an attenuator, a waveguide, a fiber optic sensor, a sensor, a fiber optic coupler, an optical fiber and a polarizer.

18. A apparatus of claims 10, wherein the optical fiber device comprises at least one of a wavelength division multiplexer, a wideband fiber optic coupler, a coupler, a switch, a filter, an attenuator, a waveguide, a fiber optic sensor, a sensor, a fiber optic coupler, an optical fiber and a polarizer.

19. A apparatus of claims 11, wherein the optical fiber device comprises at least one of a wavelength division multiplexer, a wideband fiber optic coupler, a coupler, a switch, a filter, an attenuator, a waveguide, a fiber optic sensor, a sensor, a fiber optic coupler, an optical fiber and a polarizer.

20. An apparatus comprising:
   at least one optical fiber device including a region;
   a ferrule having an aperture therethrough completely or partially therethrough with a compliant material therein, the aperture of said ferrule being expanded responsive to application of energy thereto, and the region of said at least one optical fiber device being inserted therethrough while the aperture of said ferrule is expanded for securing to the aperture of said ferrule after the aperture subsequently contracts.

21. An apparatus comprising:
   at least one optical fiber device including a region;
   a ferrule having an aperture completely or partially therethrough with a compliant material therein, the aperture of said ferrule being expanded responsive to application of energy or an external substance thereto, and the region of said at least one optical fiber device being inserted therethrough while the aperture of said ferrule is expanded for shrinkfit securing thereto.

22. An apparatus comprising:
   a ferrule having an aperture therethrough;
   at least one optical fiber device including a region and being shrunken responsive to application of energy or an external element thereto, and the region of said at least one optical fiber device being inserted through the aperture while said at least one optical fiber device is shrunken for shrinkfit securing thereto.

23. An apparatus comprising:
   at least one optical fiber including a region;
   a ferrule having an aperture;
   a metal or metal alloy securing material, completely or partially disposed in the aperture of said ferrule, at least one of sealing and securing the region of the at least one optical fiber to said aperture of said ferrule.

24. An apparatus comprising:
   at least one optical fiber device including a region;
   means for holding said at least one optical fiber device, said holding means including an aperture;
   means for securing said at least one optical fiber device in said holding means, said securing means being completely or partially disposed in said holding means and securing the region of the at least one optical fiber device to said aperture of said holding means.

25. An apparatus comprising:
   at least one optical fiber and device including a region;
   a connection element having a connection area and an aperture; and
   a metal or metal alloy securing material, completely or partially disposed in the aperture of said connection element, at least one of sealing and securing the region at the at least one optical fiber and device to the aperture of said connection element.

26. An apparatus according to claim 25, wherein said metal or metal alloy securing material hermetically seals the at least one optical fiber and device to the aperture of said connection element.

* * * * *